2,695,241

SEALING CERAMIC AND ITS METHOD OF PRODUCTION

Jean Calis, Paris, France, assignor to Compagnie Generale de Telegraphie Sans Fil, a corporation of France No Drawing. Application May 24, 1951, Serial No. 228,140

Claims priority, application France June 9, 1950

10 Claims. (Cl. 106—52)

The present invention refers to ceramics having a very low expansion coefficient, and more particularly to the making of pieces for parts of airtight enclosures.

In some cases, it is necessary to make sealings between glasses, ceramics and metals. These sealings are difficult to make except when the sealed pieces have the same expansion coefficient. In electrotechnics and especially in the electronics field very often use is made of metals whose expansion coefficient is very small. Among those, for example, tungsten, with an expansion coefficient of about $40.10^{-7}$ could be mentioned as frequently used in the making of the connections passing through the insulating parts of the airtight enclosures of electronic tubes and apparatus. It is often useful and convenient to make the insulating parts of airtight apparatus by using ceramics which have excellent electrical and mechanical qualities, and besides are easy to shape before being baked in kilns. Ceramics with an expansion coefficient ranging between 45 and $60.10^{-7}$ are already known.

The object of the present invention is a new ceramic combination having an expansion coefficient ranging between 38 and $45.10^{-7}$, good resistance to thermic shocks, a small loss angle and which allows the making of airtight pieces.

Its object moreover is any article using parts made with such ceramics.

According to the invention, the main feature of these ceramics is their total content of alumina ($Al_2O_3$) ranging from 50 to 60% which determines their expansion coefficient, and of silica ($SiO_2$) ranging from 33 to 38% and preferably introduced in the form of alumina silicate. The remainder is constituted by fluxes which in combination with silica, secure the formation of a vitrous state which lets the final product be airtight.

As a nonlimiting example, a combination according to the invention can be made, starting from a mixture including:

| | |
|---|---|
| Alumina ($Al_2O_3$) | 23.5 |
| Argil ($SiO_2$)$_2Al_2O_3.2H_2O$ + some impurities | 4.8 |
| Kaolin ($SiO_2$)$_2Al_2O_3.2H_2O$ | 60.7 |
| Dolomite ($CO_3$)$_2MgCa$ | 5.57 |
| Zinc oxide (ZnO) | 1.74 |
| Barium carbonate ($BaCO_3$) | 1.74 |
| Minium ($Pb_2O_3$) | 1.74 |

This mixture being transformed into paste which is worked up so as to give it the desired shape, results in a ceramic with an expansion coefficient of $42.10^{-7}$.

The alumina is introduced into the mixture in the form of alumina silicates (argil and kaolin) in order to give the paste the necessary plasticity for making pieces of desired shape, and also in order to obtain the required percentage of silica. The alumina necessary for completing addition up to the desired percentage is introduced in the form of pure alumina, preferably dehydrated alumina, such as so called electromelted alumina. Hydrated alumina endangers the airtightness of the piece by creating pores due to the release of steam in the course of baking. It is purposely avoided to use alkali fluxes which increase the loss angle. The fluxes will preferably be constituted of oxides or salts such as carbonates, of metals such as zinc, lead, magnesium, calcium and barium, which do not increase the loss angle, decrease the baking temperature down to an appropriate temperature generally around 1400° and provide good vitrifaction.

In the finished product, after baking, nothing but oxides remain, whose proportions may vary within the above mentioned limits.

What I claim is:

1. A process of manufacturing ceramics having a coefficient of expansion between 38 and $45 \times 10^{-7}$ and being adapted to form airtight seals with glass, metals and other ceramics, consisting essentially in the steps of mixing 23.5% by weight anhydrous alumina with about 65.5% by weight of at least one alumina-silica mineral having the formula $Al_2O_3(SiO_2)_2.2H_2O$ and with 5.57% dolomite and 1.74% each of zinc oxide, barium carbonate and lead oxide, the balance of the mixture being impurities, so as to form a mixture containing between 50–60% by weight alumina and 33–38% by weight silica; forming a paste of said mixture and subjecting the thus formed paste to a heat treatment so as to form a ceramic having a coefficient of expansion of $42 \times 10^{-7}$.

2. A ceramic material having a coefficient of expansion between 38 and $45 \times 10^{-7}$ and being adapted to form airtight seals with glass, metals and other ceramics, said ceramic material essentially consisting of 50–60% by weight alumina and 33–38% by weight silica, the balance being fluxes, said ceramic material being free of alkali oxides.

3. A process of manufacturing ceramics having a coefficient of expansion between 38 and $45 \times 10^{-7}$ and being adapted to form airtight seals with glass, metals and other ceramics, consisting essentially in the steps of forming a paste of ceramic-forming ingredients consisting essentially of alumina in an amount of between 50–60% by weight of said ceramic-forming ingredients, silica in an amount of between 33–38% by weight of said ceramic-forming ingredients and the balance of said ceramic-forming ingredients being substantially fluxes, said paste being free of alkali oxides; and subjecting said paste to a heat treatment to form a ceramic having a coefficient of expansion between 38 and $45 \times 10^{-7}$.

4. A process of manufacturing ceramics having a coefficient of expansion between 38 and $45 \times 10^{-7}$ and being adapted to form airtight seals with glass, metals and other ceramics, consisting essentially in the steps of forming a paste of ceramic-forming ingredients consisting essentially of alumina in an amount of between 50–60% by weight of said ceramic-forming ingredients, silica in an amount of between 33–38% by weight of said ceramic-forming ingredients and the balance of said ceramic-forming ingredients being substantially fluxes, said paste being free of alkali oxides; and burning said paste at a temperature of about 1400° C. so as to form a ceramic having a coefficient of expansion between 38 and $45 \times 10^{-7}$.

5. A process of manufacturing ceramics having a coefficient of expansion between 38 and $45 \times 10^{-7}$ and being adapted to form airtight seals with glass, metals and other ceramics, consisting essentially in the steps of forming a paste of ceramic-forming ingredients consisting essentially of alumina in an amount of between 50–60% by weight of said ceramic-forming ingredients, silica in an amount of between 33–38% by weight of said ceramic-forming ingredients and the balance of said ceramic-forming ingredients being substantially fluxes, said paste being free of alkali oxides; shaping said paste to a predetermined shape; and subjecting the thus shaped paste to a heat treatment to form a ceramic having a coefficient of expansion between 38 and $45 \times 10^{-7}$.

6. A process of manufacturing ceramics having a coefficient of expansion between 38 and $45 \times 10^{-7}$ and being adapted to form airtight seals with glass, metals and other ceramics, consisting essentially in the steps of forming a paste of ceramic-forming ingredients consisting essentially of alumina in an amount of between 50–60% by weight of said ceramic-forming ingredients, silica in an amount of between 33–38% by weight of said ceramic-forming ingredients and the balance of said ceramic-forming ingredients being substantially fluxes, said paste being free of alkali oxides; shaping said paste to a predetermined shape; and burning the thus shaped paste at a temperature of about 1400° C. so as to form a ceramic having a coefficient of expansion between 38 and $45 \times 10^{-7}$.

7. A process of manufacturing ceramics having a coefficient of expansion between 38 and $45 \times 10^{-7}$ and being adapted to form airtight seals with glass, metals and other ceramics, consisting essentially in the steps of forming a paste of ceramic-forming ingredients consisting essentially of alumina in an amount of between 50–60% by weight of said ceramic-forming ingredients, silica in an amount of between 33–38% by weight of said ceramic-forming ingredients and the balance of said ceramic-forming ingredients being substantially fluxes selected from the group consisting of oxides and carbonates of zinc, lead, magnesium, calcium and barium, said paste being free of alkali oxides; and subjecting said paste to a heat treatment to form a ceramic having a coefficient of expansion between 38 and $45 \times 10^{-7}$.

8. A process of manufacturing ceramics having a coefficient of expansion between 38 and $45 \times 10^{-7}$ and being adapted to form airtight seals with glass, metals and other ceramics, consisting essentially in the steps of mixing with an alumina-silica mineral having the formula $$Al_2O_3(SiO_2)_2.2H_2O$$

and with at least one flux an amount of anhydrous alumina such that the resulting mixture contains between 50–60% alumina by weight and between 33–38% silica by weight, the balance being substantially fluxes and said mixture being free of alkali oxides; forming a paste of the thus formed mixture; and subjecting the thus formed paste to a heat treatment to form a ceramic having a coefficient of expansion between 38 and $45 \times 10^{-7}$.

9. A process of manufacturing ceramics having a coefficient of expansion between 38 and $45 \times 10^{-7}$ and being adapted to form airtight seals with glass, metals and other ceramics, consisting essentially in the steps of mixing with an alumina-silica mineral having the formula $$Al_2O_3(SiO_2)_2.2H_2O$$

and with at least one flux an amount of anhydrous alumina such that the resulting mixture contains between 50—60% alumina by weight and between 33–38% silica by weight, the balance being substantially fluxes and said mixture being free of alkali oxides; shaping the thus formed paste to a predetermined shape; and burning the thus shaped paste at a temperature of about 1400° C. so as to form a ceramic having a coefficient of expansion between 38 and $45 \times 10^{-7}$.

10. A process of manufacturing ceramics having a coefficient of expansion between 38 and $45 \times 10^{-7}$ and being adapted to form airtight seals with glass, metals and other ceramics, consisting essentially in the steps of mixing with an alumina-silica mineral having the formula $$Al_2O_3(SiO_2)_2.2H_2O$$

and with at least one flux an amount of anhydrous alumina such that the resulting mixture contains between 50–60% alumina by weight and between 33–38% silica by weight, the balance being substantially magnesium carbonate, calcium carbonate, zinc oxide, barium carbonate and lead oxide as fluxes and said mixture being free of alkali oxides; forming a paste of the thus formed mixture; and subjecting the thus formed paste to a heat treatment to form a ceramic having a coefficient of expansion between 38 and $45 \times 10^{-7}$.

References Cited in the file of this patent

UNITED STATES PATENTS

| Number | Name | Date |
|---|---|---|
| 700,673 | Buchner | May 20, 1902 |
| 1,760,360 | Hood | May 27, 1930 |
| 1,786,482 | Curtis | Dec. 30, 1930 |
| 2,105,166 | Schwarzkopf | Jan. 11, 1938 |
| 2,317,855 | Hepner et al. | Apr. 27, 1943 |

FOREIGN PATENTS

| Number | Country | Date |
|---|---|---|
| 315,856 | Great Britain | (1930) |
| 402,588 | Great Britain | (1933) |
| 606,025 | France | (1926) |